UNITED STATES PATENT OFFICE.

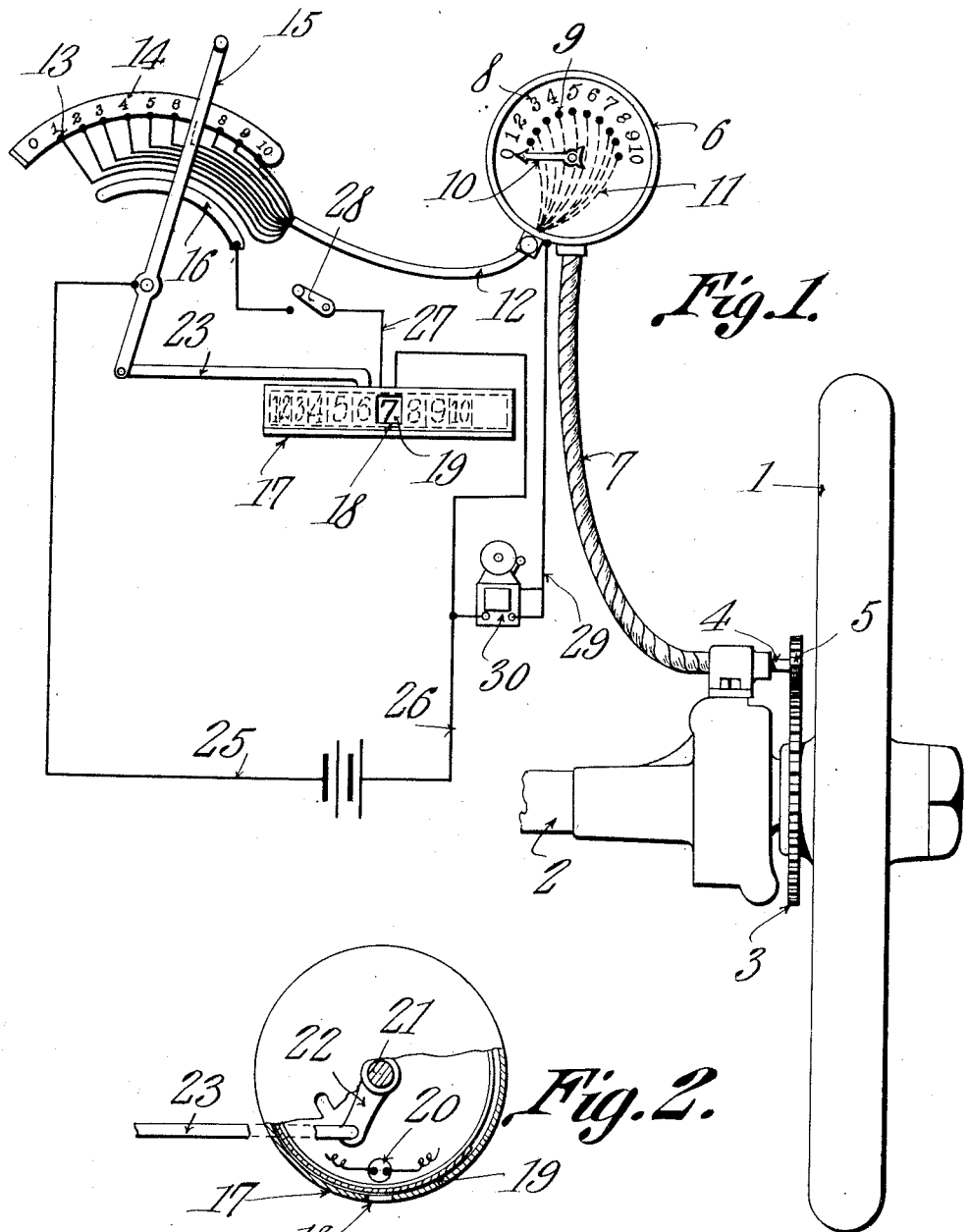

FABIUS M. BUTLER, OF DAVID CITY, NEBRASKA.

SPEED-LIMIT-SIGNALING APPARATUS.

1,010,412. Specification of Letters Patent. Patented Dec. 5, 1911.

Application filed January 21, 1910. Serial No. 539,227.

*To all whom it may concern:*

Be it known that I, FABIUS M. BUTLER, a citizen of the United States, residing at David City, in the county of Butler and State of Nebraska, have invented a new and useful Speed-Limit-Signaling Apparatus, of which the following is a specification.

This invention has reference to improvements in apparatus for causing a signal when a predetermined speed limit of a moving vehicle or other apparatus has been reached.

The apparatus is designed more particularly for use in connection with automobiles but may be used in connection with other vehicles or with moving parts of machinery where it is desirable that notice be given when a certain predetermined speed has been reached.

It is the design of the present invention to provide a means whereby an audible signal will be caused should a predetermined speed be reached or exceeded and at the same time the predetermined speed will be indicated visually in position to be observed by others than the occupant of the vehicle, the following description being for convenience limited to the use of the invention in connection with an automobile with the understanding however that the invention may be used in whole or in part in connection with other vehicles or moving members.

The invention will be best understood from a consideration of the following detail description taken in connection with the accompanying drawings forming a part of this specification, in which drawings, Figure 1 is a partially structural diagram illustrating the application of the invention to an automobile. Fig. 2 is a plan view of the means for visually indicating the predetermined speed limit, with parts of the structure broken away.

Referring to the drawings there is shown a wheel 1 and a portion of its axle 2 and these parts may be taken as typifying an automobile or other vehicle or any moving structure to which the invention may be applicable.

Fast on the hub of the wheel 1 is a gear wheel 3 and mounted on any fixed portion of the running gear of the automobile is a shaft 4 terminating in a pinion 5 in mesh with the gear wheel 3.

Mounted at any convenient point on the vehicle within easy view of the operator of the vehicle is a speedometer 6 only typically indicated in the drawings, but it will be understood that this speedometer may be of any of the various forms used for the purpose but modified in a manner to be described to adapt it to the present invention.

The speedometer is connected to the shaft 4 by the usual flexible shafting 7. The speedometer is also provided with the usual index markings 8 and in operative relation to each one of these markings there is a contact stud 9 in the path of the indicator hand 10 of the speedometer so that as the hand 10 moves under the increasing speed of the vehicle it will make contact with the studs 9 successively in the order of the direction of movement of the hand or pointer 10.

Each stud 9 forms the terminal of an electric conductor 11 extending to the exterior of the speedometer where the several conductors may be grouped into a cable 12 and carried to an appropriate point where these conductors are then fanned out and carried to a series of contact studs 13 on or in operative relation to an index bar or arc 14.

Arranged in operative relation to the series of contacts 13 and to the index bar 14 is a lever 15 in whole or in part of conducting material and this lever has in operative relation thereto an extended contact 16 of such length as to remain in electrical connection with the lever during the travel of the latter over the contacts 13 and across the index plate 14, but the lever has a sufficiently extended range of travel to move at one limit of its travel off the contact 16 and away from the corresponding end member of the series of contact terminals 13, the last named position of the lever corresponding to the inert or zero position thereof.

There is provided a casing 17 having at one point an opening or passage 18 through its walls which passage may or may not be covered by a transparent medium, so that the interior of the casing may become visible.

Arranged to pass by the opening is an indicator member 19 having thereon a series of numerals in regular order corresponding to the arrangement or numerals on the speedometer and on the index plate 14. The wall of the member 19 carrying these numerals may be transparent and the numerals opaque or of a contrasting color with respect to the color of the member 19, or the wall of the member 19 may be opaque and the numerals transparent or semi-transparent.

Within the casing 17 there is lodged an electric lamp 20 in such position that when the lamp is energized the light will pass through the member 19 or through the numeral visible through the opening 18 as the case may be so that when the lamp is lighted, as in the night time, the numeral then coincident with the opening 18 will become visible.

The member 19 may be mounted upon a suitable shaft 21 from which extends a crank arm 22 connected by a link 23 to the lever 15 so that when the said lever is moved the member 19 will participate in such movement.

At an appropriate point there is located a battery 24 or other suitable source of electric current. One side of this battery is connected by a conductor 25 to the lever 15 preferably at the pivot point thereof. The other side of the battery 24 is connected by a conductor 26 to one side of the lamp 20 and the other side of this lamp is connected by a conductor 27 to the contact 16, the continuity of the conductor 27 being broken by a suitable switch 28. Branched off from the conductor 26 is another conductor 29 including an electric bell 30 and continuing to and connected to the casing of the speedometer 6 to connect through the casing to the hand or indicator 10, or this conductor may be directly connected to said indicator 10.

Let it be assumed that it is desirable to limit the speed of the vehicle to a certain definite number of miles per hour, then the lever 15 is moved until it is upon the contact 13 corresponding to the index marking on the index plate 14 designating the desired number of miles per hour. If the predetermined speed limit be seven miles per hour then the lever 15 is moved onto the contact 13 agreeing to the index 7 of the index plate 4, this position being shown in the drawings. The movement of the lever 15 to the designated position will cause a like movement of the member 19 through the connecting link 23 so that the number 7 is displayed at the opening 18. The casing 17 is so located as to be visible to persons on the line of way traversed by the automobile and need not be visible to the occupants of the automobile. The number displayed at the opening 18 will show the maximum speed to be traveled by the automobile while the position of the lever 15 on the index 14 will designate to the occupants of the automobile the predetermined maximum speed to be traveled and all speeds of the automobile will be displayed on the index of the speedometer 6.

At night time the switch 28 is closed and then there is established a circuit from the battery 24 through the conductor 25 to the switch arm 15 thence to the contact 16 in all positions of the switch arm 15 except the zero position and by the conductor 27 to the lamp 20, returning to the battery by the conductor 26. The lamp 20 therefore glows continuously while the switch 28 is closed and the lever 15 is in any position except the zero position, and if desired the contact 16 may be made long enough to cause the lamp to glow even when the lever 15 is in the zero position.

As the speed of the automobile increases the hand or lever 10 will move successively over the contacts 9 until ultimately it comes into engagement with the contact agreeing to the number 7 of the index 8. There is now established a circuit from the battery 24 by way of the conductor 25 to the lever 15 and through the latter to the contact 13 agreeing to the number 7 of the index plate or strip 14, thence by the conductor individual to the index number 7 to the corresponding contact 9 of the speedometer, thence through the hand or pointer 10, it being understood that the contacts 9 are all insulated from the speedometer casing in the particular arrangement of the parts under consideration, thence by the speedometer casing to the conductor 29 and through the bell 30 and back to the battery by way of the conductor 26 from the point where it is joined by the conductor 29. The bell 30 therefore will ring and give an audible alarm indicating that the maximum predetermined speed has been reached, this alarm being not only audible to the occupants of the vehicle, but also to others in the vicinity and attention will therefore be attracted to the number visible at the opening 18. The alarm thus produced continues so long as the maximum speed is maintained and consequently the occupants of the vehicle will be constrained to lower the speed of the vehicle until the alarm ceases.

The numbers visible through the opening 18 become so visible because of the lamp 20, at night, and may be of such color as to be readily visible in daylight.

By providing an audible or otherwise obtrusive signal which will become active when a predetermined speed has been reached the unintentional exceeding of a predetermined speed limit is prevented since the operator will at once reduce the speed sufficiently to cause the cessation of the alarm. The reckless excess of the predetermined speed limit will be prevented by the persistence of the alarm causing attention of observers to be directed to the fact that the vehicle is moving beyond the prescribed speed limit.

To cause the actuation of the alarm when the speed limit is reached whether the operator wills or not, the lever 15 and parts controlled thereby may be made accessible only to duly authorized persons other than those operating the vehicle so that the apparatus may be set for the predetermined limit and the operator will then be constrained to keep the vehicle within the speed limit under penalty of causing the actuation of the alarm and drawing attention to the excess of speed.

What is claimed is:—

1. In an apparatus of the class described, a speedometer, a series of electric contacts carried by the speedometer in the path of the movable member thereof, another series of contacts individually coupled to the contacts of the speedometer, an electric circuit including an alarm and connected on one side to the movable member of the speedometer adapted to engage the contacts thereon, means for connecting the other side of the electric circuit to any one of the second named series of contacts, a visual index, and connections between the latter and the means for connecting the electric circuit to any one of the second named series of contacts for rendering portions of the last named index member visible in accordance with the predetermined speed limit.

2. In an apparatus of the class described, a speedometer, a series of contacts carried thereby in the path of a movable member of the speedometer responsive to speed variations, another series of contacts individually coupled to the first named series of contacts, a charged electric circuit including an alarm and connected on one side to the speed responsive member of the speedometer, means for coupling the other side of the circuit to any one of the second named series of contacts, a casing containing a visual index and provided with a passage through which but one member of the index is visible at a time, connections between the said visual index member and the means for coupling the electric circuit to any one of the second series of contacts for causing like movement of the index member and said means, an electric lamp in operative relation to the said index member, and an electric circuit including the source of current and said electric lamp and maintained closed during the activity of the means for closing the alarm circuit at the second named series of contacts so long as the lamp circuit remains otherwise intact.

In testimony that I claim the foregoing as my own, I have hereto affixed my signature in the presence of two witnesses.

FABIUS M. BUTLER.

Witnesses:
J. B. POSPISIL,
J. K. MASHEK.